March 14, 1933. M. O. SLEEPER 1,901,781
PROCESS OF MAKING SHOE WELTING
Filed July 13, 1932
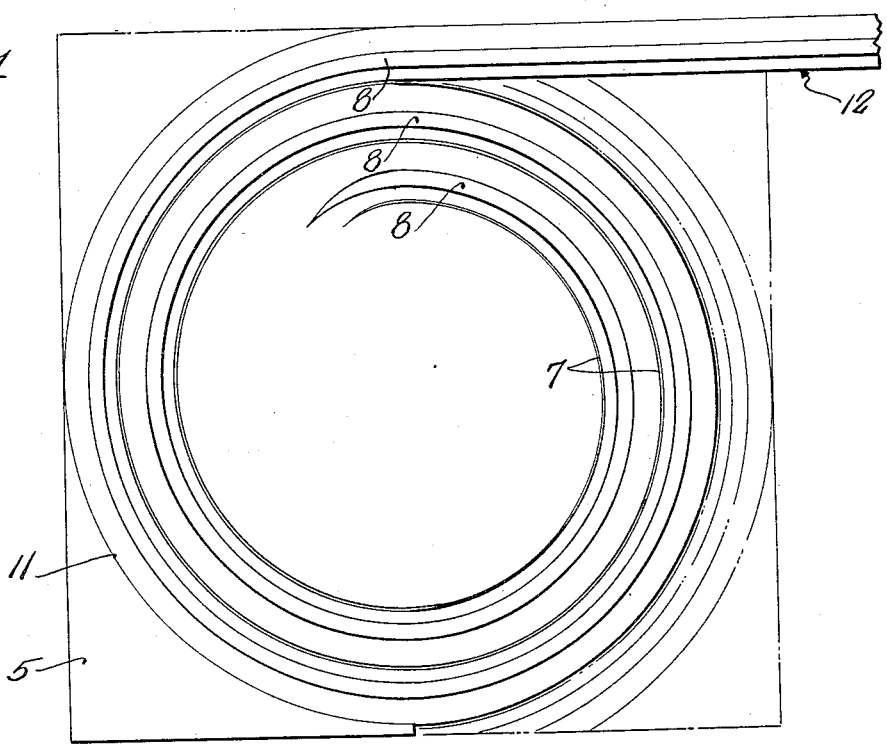
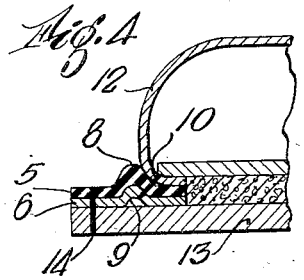
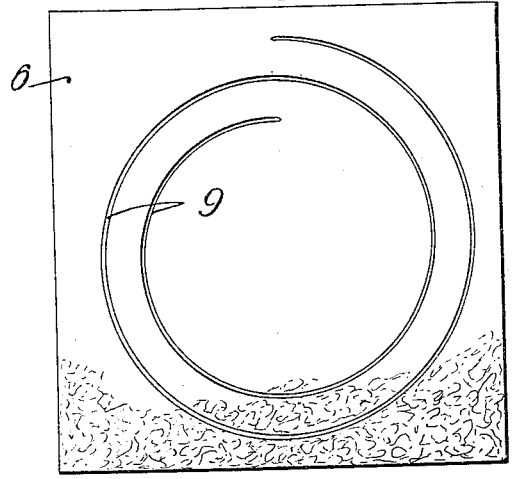
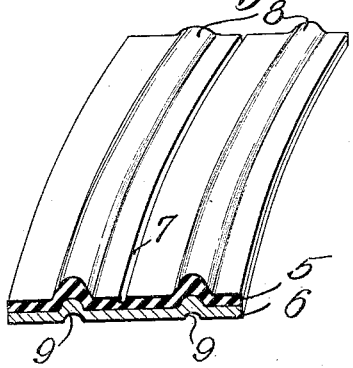

Patented Mar. 14, 1933

1,901,781

UNITED STATES PATENT OFFICE

MYRON O. SLEEPER, OF HANSON, MASSACHUSETTS, ASSIGNOR TO GEORGE A. CLAPP, OF BROOKLINE, MASSACHUSETTS, AND CARL F. WOODS, OF WINCHESTER, MASSACHUSETTS, RECEIVERS OF E. H. CLAPP RUBBER COMPANY, OF BOSTON, MASSACHUSETTS, A CORPORATION OF MASSACHUSETTS

PROCESS OF MAKING SHOE WELTING

Application filed July 13, 1932. Serial No. 622,226.

This invention relates to the production of composite welting for boots and shoes, and the principal objects of the invention are to provide a strip of welting having upper and lower layers or plies of rubber and leather or like material, respectively, firmly bonded together and adapted to be incorporated in a shoe by stitching applied in the usual manner, and to provide an improved method of making the composite welting whereby a long and continuous strip may be economically produced as a result of a single vulcanizing operation.

The improved process and its resulting product are illustrated in a preferred form in the accompanying drawing, in which:

Fig. 1 is a front view of a composite sheet in which the welting has been molded in spiral form according to my improved process, the end portion of the welting being cut free to indicate the mode of producing an elongate strip;

Fig. 2 is a rear view of the sheet prior to cutting;

Fig. 3 is a fragmentary sectional perspective of a segment of the sheet, showing two adjacent coils of the spiral welting; and Fig. 4 is a fragmentary section of a shoe equipped with the improved welting.

In accordance with this invention, the welting is manufactured by uniting a layer of rubber to a layer of leather by vulcanization in a mold or press, the dies of the mold being shaped to produce continuous spiral formations defining the coils of the composite welting material which is subsequently cut into an elongate strip. Each coil of the spiral welting is preferably of uniform width and is formed with a continuous upstanding rib and with a spiral bottom groove which serves as a guide for the ultimate stitching operation; and a spiral cutting guide or channel is preferably molded in one surface of the composite sheet intermediate adjacent coils of the ribbed welting.

The stage product or molded sheet produced by the vulcanizing press is shown in Figs. 1 and 2 and comprises an upper blank 5 of rubber or rubber composition and a bottom blank 6 of relatively thin leather, the two layers being permanently united in superposed relation. The upper surface of the blank preferably has a spiral channel 7 which defines the progressive coils of the welting and serves as a guide line for a cutting tool used to separate the coils and provide a continuous, elongate welting strip. Each coil of the spiral welting material is formed with a rib 8 projecting upwardly from its top surface and has a bottom groove 9 located beneath said rib and constituting the guide recess for the welt stitching 10 (Fig. 4).

When the blanks are rectangular, as shown, the corners of the molded sheet are trimmed to the outline 11 of the spiral welting, and the coils are then separated by cutting along the guide line 7 as aforesaid, thereby to produce the ultimate welting strip as indicated at 12, Fig. 1. It will be understood however that the sheet may be circular if desired, and it will be evident that the length of the welting strip will depend upon the effective diameter of the molded sheet and the width of the finished product. For example, a composite sheet having a diameter of two and one-half feet should produce a continuous welt at least one hundred feet long and approximately 15/32 inch wide.

This improved method of making composite welting not only saves considerable time and labor in the production of a relatively long strip, but also avoids the necessity of overlapping and revulcanizing the ends of several short, straight strips or pieces. It is apparent that a straight strip one hundred feet long will require a mold of the same length or will necessitate repeated lapping and curing of shorter sections; whereas the spiral process employs a mold of normal size and eliminates the tendency of overcuring caused by lapping and revulcanization. The advantages of the improved process are particularly apparent when contrasted with the prevailing practice of splicing together several short pieces of leather to provide a long and relatively wide strip which is subsequently divided into narrow welting strips by cutting the spliced leather in a lengthwise direction. In such case, when the splicing operation produces a defective lap, several lengths of the welting are spoiled.

Furthermore, the resulting welting strip will have a slight curvature which enables it to be shaped more readily around the toe of the shoe. A welt made in this manner thus ensures substantial economies in manufacture as compared with an all-leather welting; yet the thin leather backing affords equal security for the welting stitching 10, while the ribbed rubber facing provides greater resilience and enables the improved welt to fit tightly and evenly against the shoe upper 12 as shown in Fig. 4, thereby affording a waterproof union between welt and upper. The composite welting may be secured to the outsole 13 by stitching 14 in accordance with common practice, and the leather base 6 also provides security for the sole stitching.

From the foregoing it will be evident that my improved process consists in uniting the rubber and leather blanks by vulcanization to provide a composite moldable sheet, molding the sheet to provide spiral convolutions which define the outline of the welting coils and the characteristic shape of the ultimate welting strip, and then cutting between the welting coils, preferably along the guide line or channel 7, to produce a continuous strip of welting. The uniting and molding of the blanks or layers are preferably accomplished simultaneously in a single vulcanizing operation through the use of appropriate plates or dies adapted to produce the spiral formations above described but it will be understood that these steps may be performed successively without departing from the spirit of this invention as defined in the appended claims. It will also be apparent that certain valuable aspects of the invention reside in the production of the molded composite sheet as a stage product of my process, as well as in the novel characteristics of the ultimate welting strip which has the molded longitudinal rib 8 in its rubber facing 5 and the parallel, underlying groove 9 in its leather backing 6.

It will be understood that the particular materials used in producing the improved composite welting may be varied to suit particular purposes. For example, the upper layer may be of any suitable moldable material which is preferably resilient and waterproof; and the bottom layer may be of a sheet material adapted to combine with the upper layer and to serve as an anchorage for the welt stitching. Hence, when I use the terms "rubber" or "leather" in the appended claims, I mean to include like or equivalent materials within the scope of this invention.

I claim:

1. A method of making composite welting which consists in uniting blanks of rubber and leather in superposed relation, forming a spiral line in the surface of the resulting sheet thereby to define welting coils of substantially uniform width, and cutting along said line to produce a continuous strip of welting.

2. A method of making composite welting which consists in uniting blanks of leather and rubber in superposed relation, molding a spiral rib in the rubber blank and a complemental spiral groove in the surface of the leather blank, and cutting between the coils of the ribs to produce a continuous strip of welting.

3. A method of making composite welting which consists in uniting blanks of leather and rubber in superposed relation, forming a spiral channel in the rubber blank and simultaneously molding a spiral rib in said blank intermediate the coils of said channel, and cutting along said channel to produce a continuous strip of welting.

4. A method of making composite welting which consists in simultaneously molding and vulcanizing together a leather backing sheet and a rubber facing sheet to form a spiral welting rib in the rubber sheet and a complemental stitching guide groove in the surface of the leather sheet, and to provide a spiral cutting guide intermediate the coils of said rib, and then cutting along said guide to produce a continuous strip of welting.

5. As a stage product in the manufacture of composite welting, a molded sheet comprising an upper layer of rubber and a lower layer of leather united thereto in superposed relation, the surface of the rubber layer having a continuous spiral rib, adjacent coils of the rib being spaced uniformly, and said layer having a spiral guide channel disposed intermediate said coils, the bottom surface of the leather layer having a spiral groove substantially coinciding with said rib.

In testimony whereof I affix my signature.

MYRON O. SLEEPER.